(12) United States Patent
Bagherpour et al.

(10) Patent No.: US 10,585,277 B2
(45) Date of Patent: Mar. 10, 2020

(54) SYSTEMS AND METHODS FOR TRACKING A GAZE OF A USER ACROSS A MULTI-DISPLAY ARRANGEMENT

(71) Applicant: Tobii AB, Danderyd (SE)

(72) Inventors: Farshid Bagherpour, Pittsburgh, PA (US); Mårten Skogö, Stockholm (SE)

(73) Assignee: Tobii AB, Danderyd (SE)

( * ) Notice: Subject to any disclaimer, the term of this patent is extended or adjusted under 35 U.S.C. 154(b) by 37 days.

(21) Appl. No.: 15/692,646

(22) Filed: Aug. 31, 2017

(65) Prior Publication Data

US 2019/0064513 A1 Feb. 28, 2019

(51) Int. Cl.
| | |
|---|---|
| G06F 3/01 | (2006.01) |
| G06F 3/03 | (2006.01) |
| G02B 27/00 | (2006.01) |
| G06F 3/0484 | (2013.01) |
| G03B 15/16 | (2006.01) |
| G06K 9/00 | (2006.01) |

(52) U.S. Cl.
CPC ......... *G02B 27/0093* (2013.01); *G06F 3/013* (2013.01); *G06F 3/0484* (2013.01); *G03B 15/16* (2013.01); *G06F 2203/0382* (2013.01); *G06K 9/00604* (2013.01)

(58) Field of Classification Search
None
See application file for complete search history.

(56) References Cited

U.S. PATENT DOCUMENTS

| | | | |
|---|---|---|---|
| 2012/0218398 A1 | 8/2012 | Mehra | |
| 2012/0233059 A1 | 9/2012 | Buck | |
| 2014/0118357 A1* | 5/2014 | Covington | G06F 3/011 345/473 |
| 2016/0378179 A1* | 12/2016 | Baca | G06F 3/038 345/156 |
| 2018/0007422 A1* | 1/2018 | Castleman | H04L 65/604 |

FOREIGN PATENT DOCUMENTS

| | | |
|---|---|---|
| EP | 3040809 A1 | 7/2016 |
| EP | 3451126 | 3/2019 |

* cited by examiner

*Primary Examiner* — Carl Adams
(74) *Attorney, Agent, or Firm* — Samuel I. Yamron

(57) ABSTRACT

According to the invention, a system for tracking a gaze of a user across a multi-display arrangement is disclosed. The system may include a first display, a first eye tracking device, a second display, a second eye tracking device, and a processor. The first eye tracking device may be configured to determine a user's gaze direction while the user is gazing at the first display. The second eye tracking device may be configured to determine the user's gaze direction while the user is gazing at the second display. The processor may be configured to determine that the user's gaze has moved away from the first display in a direction of the second display, and in response to determining that the user's gaze has moved away from the first display in the direction of the second display, deactivate the first eye tracking device, and activate the second eye tracking device.

25 Claims, 6 Drawing Sheets

SYSTEMS AND METHODS FOR TRACKING A GAZE OF A USER ACROSS A MULTI-DISPLAY ARRANGEMENT

BRIEF SUMMARY OF THE INVENTION

In one embodiment, a system for tracking a gaze of a user across a multi-display arrangement is provided. The system may include a first display, a first eye tracking device, a second display, a second eye tracking device, and a processor. The first eye tracking device may be configured to determine a user's gaze direction while the user is gazing at the first display. The second eye tracking device may be configured to determine the user's gaze direction while the user is gazing at the second display. The processor may be configured to determine that the user's gaze has moved away from the first display in a direction of the second display. The processor may also be configured to, in response to determining that the user's gaze has moved away from the first display in the direction of the second display, deactivate the first eye tracking device, activate the second eye tracking device.

In another embodiment, a method for tracking a gaze of a user across a multi-display arrangement is provided. The method may include determining a user's gaze direction with a first eye tracking device while the user is gazing at a first display. The method may also include determining the user's gaze direction with a second eye tracking device while the user is gazing at a second display. The method may further include determining that the user's gaze has moved away from the first display in a direction of the second display. The method may additionally include, in response to determining that the user's gaze has moved away from the first display in the direction of the second display, deactivating the first eye tracking device, and activating the second eye tracking device.

In another embodiment, a non-transitory machine readable medium is provided. The non-transitory machine readable medium may have instructions stored thereon for tracking a gaze of a user across a multi-display arrangement. The instructions may be executable by one or more processors to perform a method. The method may include determining a user's gaze direction with a first eye tracking device while the user is gazing at a first display. The method may also include determining the user's gaze direction with a second eye tracking device while the user is gazing at a second display. The method may further include determining that the user's gaze has moved away from the first display in a direction of the second display. The method may additionally include, in response to determining that the user's gaze has moved away from the first display in the direction of the second display, deactivating the first eye tracking device, and activating the second eye tracking device.

BRIEF DESCRIPTION OF THE DRAWINGS

Embodiments of the present invention are described in conjunction with the appended figures.

Figure 1:
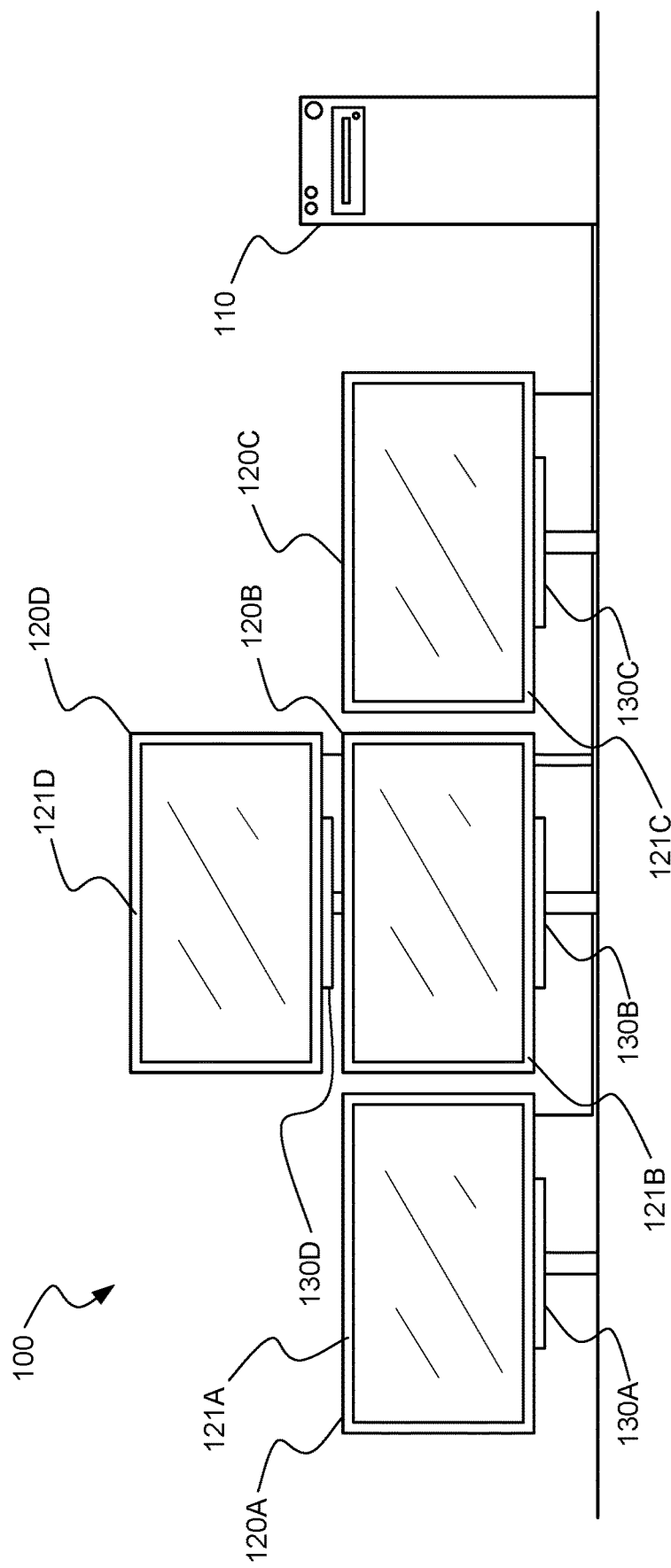
FIG. 1 is a representative view of one system of the invention for tracking a gaze of a user across a multi-display arrangement.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to an embodiment herein shall be an implicit recognition that such detail may or may not be present in any version of any embodiment discussed herein. That meaning, the detail's absence in the discussion of an embodiment is understood to be a specifically contemplated version of the embodiment, not having the detail.

Specific details are given in the following description to provide a thorough understanding of the embodiments. However, it will be understood by one of ordinary skill in the art that the embodiments may be practiced without any one specific detail. Additionally, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

FIG. 1 shows a system 100 having a processor 110 and a plurality of display devices 120. Though processor 110 is a desktop personal computer having four LCD/LED displays 120 in this embodiment, other embodiments of the invention may include any multi-display arrangement associated with a variety of computing/processing devices, each of which may have one or more processors configured to implement embodiments of the invention. For example, embodiments of the invention may applied to multi-display arrangements on laptop and notebook computers, tablet computing devices, personal data assistants, smart phones, and other mobile user devices. In some embodiments, each display may be associated with different processors in communication with each other. For example, one display may be part of, and controlled by a tablet computing device, while another display may be part of, and controlled by a laptop computer. The processors of each device may be in communication to coordinate implementation of certain embodiments described herein. Any other arrangement of the above components is also possible in various embodiments of the invention.

In the embodiment shown in FIG. 1, system 100 includes four displays 120, but in other embodiments, fewer or greater number of display devices 120 may be present. System 100 also includes four eye tracking devices 130, where each eye tracking device 130 is associated with a different display device 120 (i.e., eye tracking device 130A is associated with display device 120A; eye tracking device 130B is associated with display device 120B; etc.). Display devices 120 and eye tracking devices 130 are in communication with processor 110 via either wired or wireless communication means. Processor 110 may execute operating systems and other software packages capable of controlling the content displayed on display devices 120, as well as communicating with eye tracking devices 130 in order to determine the gaze location of a user therewith. Processor 110 may therefore be able to determine a gaze direction of a user of system 100, and also do so relative to content displayed on display devices 120 upon calibration of each eye tracking device 130. In some embodiments, any or all of eye tracking devices 130 may be able to determine a gaze direction of a user without assistance from processor 110, and thereafter inform processor 110 of the user's gaze direction.

Though all display devices 120 and eye tracking devices 130 are shown in-plane with each other in FIG. 1, in practice each display device 120 and associated eye tracking device 130 may be rotated about the Z-axis (e.g., display devices 120A, 120C and eye tracking devices 130A, 130C) or about the X-axis (e.g., display device 120D and eye tracking device 130D) such that they more directly face a user who is primarily facing display device 120B and eye tracking device 130B (i.e., the center display device).

Each eye tracking device 130 may only be able to accurately and consistently track the gaze of a user only when the user's gaze is directed generally toward that eye tracking device 130, and the display device 120 associated that particular eye tracking device 130. In other words, while a particular eye tracking device 130 may be able to determine the gaze direction of a user when the user's gaze direction is directed toward an effective area of an associated display device 120, the ability of the eye tracking device 130 to determine the gaze direction away from the effective area may be impaired or not possible as the user's gaze direction is located further and further therefrom. The effective area of a display device 120, as referred to herein, is that portion of display device 120 which is capable of effectively displaying dynamic images. In other words, the bezel 121 or other non-dynamic chassis/portion of a display device 120 is not part of the effective area of a display device 120.

Figure 2:
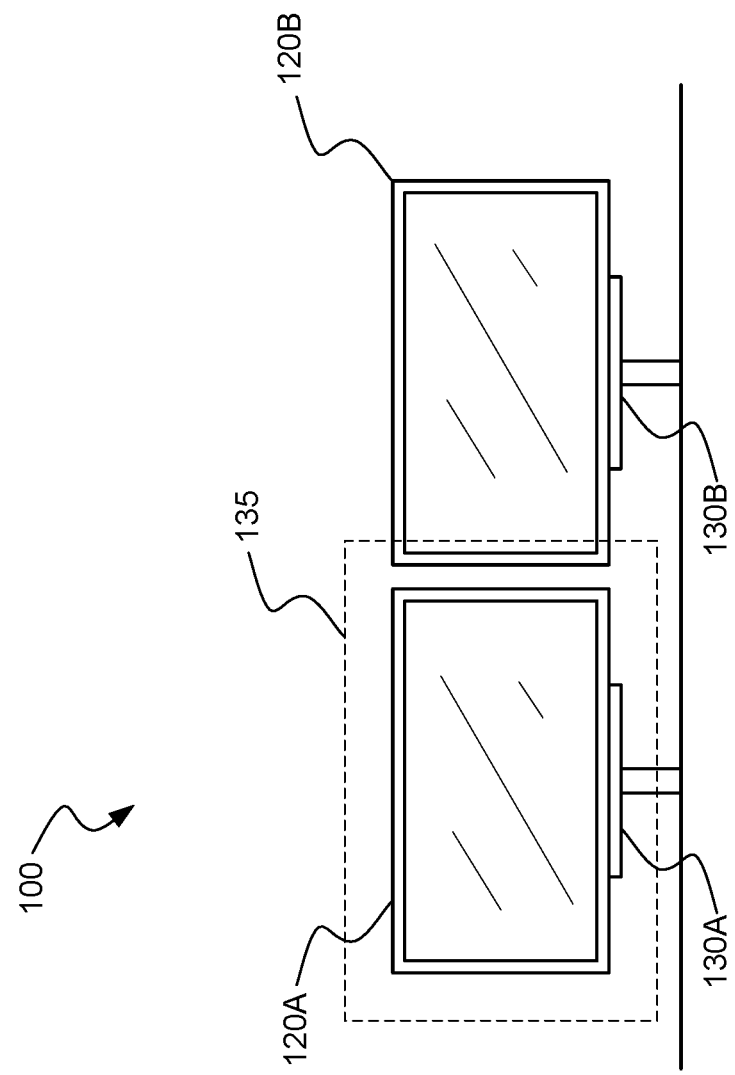
FIG. 2 is a representative view of a portion of the system from FIG. 1, also showing the effective range of an eye tracking device associated with a display.

In many embodiments, each eye tracking device 130 may be able to determine a user's gaze when directed at the effective area of an associated display device 120, as well as some distance from each edge of the effective area of the associated display device 120. For purposes of explanation, FIG. 2 shows only display devices 120A, 120B from FIG. 1, along with associated eye tracking devices 120A, 120B. Also shown is the reliable range 135 at which the user's gaze direction, when generally directed at display device 120A, is reliably determinable by eye tracking device 130A. Thus, the reliable range 135 of eye tracking extends beyond the effective area of display device 120A, and in this example, extends even to the effective area of display device 120B. Eye tracking device 130B may also have a similar reliable range, which thus extends even to the effective area of display device 120A, as well as overlaps the reliable range of eye tracking device 130A. In some embodiments, any or all of eye tracking devices 130 may be able to determine a gaze direction of a user without assistance from processor 110, and thereafter inform processor 110 of the user's gaze direction.

Thus, each eye tracking device 130 may be able to determine a user's gaze direction when they are gazing at an associated display device 120 (and/or an effective area thereof), as well the user's gaze direction when they are not gazing at an associated display device 120 (and/or an effective area thereof). However, the ability of each eye tracking device 130 to determine a user's gaze direction when they are not gazing at an associated display device 120, may diminish the further the user's gaze is directed from the associated display device. At some distance from a given display device 120, an eye tracking device 130 associated with the given display device 120 may not be able to determine a gaze direction of the user because the user's eyes are not sufficiently in range of, or directed at, image sensors, illuminators, and/or other components commonly used to implement the functioning of many eye tracking devices 130.

A user's eyes may not be sufficiently in range of a particular eye tracking device 130 when any one or more of a plurality of conditions is present. Merely by way of example, if one of the user's eyes is not detected as gazing to within a track box of the particular eye tracking device 130, the user's eyes may not be sufficiently in range of the particular eye tracking device. The track box of an eye tracking device 130 is defined as the area or volume in which the eye tracking device 130 may be able to detect and determine a user's gaze, or be able to identify at least some portion of the user (i.e., an eye, a head, etc.). In another example, if a predetermined length of time passes without detection of both eyes of the user by an eye tracking device 130, the user's eyes may not be sufficiently in range. In yet other embodiments, the sized area which include or included the user's eyes or the user's head, or some portion thereof, not being detected within the track box of an eye tracking device 130 for a predetermined period of time may indicate the user's eyes are not sufficiently in range of a particular eye tracking device 130. In some embodiments, a combination of such factors may result in the user's eyes not being sufficiently in range.

Returning to FIG. 1, in some embodiments, upon initialization of use of system 100, or at least initialization of gaze detection processes, processor 110 may be configured to determine, by polling each eye tracking device 130, which display device 120 the user is currently gazing at. Merely by way of example, if a user is gazing at a particular display device 120, the eye tracking device 130 associated therewith may be able to consistently determine a direction of the user's gaze with respect thereto over at least a predetermined period of time. Likewise, if the user is not gazing at a given display device 120, eye tracking devices 130 may not be able to detect both eyes of the user, or may only intermittently be able to determine the gaze direction of the user. Upon determining which display device 120 the user is gazing at, processor 100 may maintain the active status of the eye tracking device 130 associated with that display device 120, but deactivate eye tracking devices 130 associated with other display devices 120.

An "active" or "activated" eye tracking device 130 may be any eye tracking device 130 which is currently fully powered and/or actively attempting to detect and/or determine the gaze direction of a user (perhaps with assistance from processor 110). An "inactive" or "deactivated" eye tracking device 130 may be any eye tracking device which is not currently fully powered and/or not actively attempting to detect and/or determine the gaze direction of a user.

In some embodiments, the illumination intensity of illuminators in a deactivated eye tracking device 130 may be lowered compared to an active eye tracking device 130. Additionally or alternatively, the frequency at which such illuminators are activated in a deactivated eye tracking device 130 may also be decreased compared to an active eye tracking device 130. In some embodiments, an image sensor of a deactivated eye tracking device 130 may also be operated at a lower frequency (frame rate) compared to an active eye tracking device 130. For example, a frame rate of an image sensor in an inactive eye tracking device 130 may decrease to 50% or less of an active eye tracking device 130. In some embodiments, deactivated eye tracking devices 130 may lower the number of pixels used compared to active eye tracking devices 130. For example, the size of the imaging area may be decreased, or pixel binning (aggregated determination of pixel rows/columns in an image sensor) may be employed. In some embodiments, imaging and illumination parameters may be adjusted over time, especially if the system is attempting to "find" the user's eyes with any one or more of the eye tracking devices 130.

By way of an illustrative example, if the user is gazing at display device 120B, eye tracking device 130B may be able to consistently determine a gaze direction of the user, but eye tracking devices 130A, 130C may only detect the presence of one eye, or no eye, and therefore be unable to determine the overall gaze direction of the user (where the overall gaze direction of the user is the combined and/or intersecting gaze direction of both eyes of the user). Alternatively, eye tracking devices 130A, 130C may be able to detect the gaze direction of the user, but not do so consistently. In the same example, where the user's gaze remains directed to display device 120B in a case when the user's gaze is transitioning between different eye trackers, eye tracking device 130D may not be able to detect any eyes of the user, or may not be able to consistently determine a gaze direction of the user.

Alternatively, in other embodiments, processor 110 may cause a particular display device 120 to display content which directs the user to gaze upon the particular display device 120. For example, a calibration pattern may be displayed on a display device 120B, thereby causing the user to direct his/her gaze thereto. Upon, or prior to, determining that the user's gaze is detected within the track box of the associated eye tracking device 130B, the associated eye tracking device 130B may remain active, while other eye tracking devices 130A, 130C, and 130D may be deactivated or remain deactivated.

Processor 110 may be configured to determine that the user's gaze has moved away from a first display 120 in a direction of a second display 120, and in response thereto, deactivate a first eye tracking device 130, and activate a second eye tracking device 130. In this manner, only one eye tracking device 130 in system 100 may be active at a time, thereby reducing power consumption of system 100, due to deactivation of eye tracking devices 130 which are not in immediate use, as well reduced processing requirements needed to control and process data from inactive eye tracking devices 130. However, in many embodiments, multiple eye tracking devices 130 may be active at a given time to facilitate a handover process between two eye tracking devices 130 as the user's gaze location moves from one display 120 to another.

The manners in which processor 110, or other components of system 100 may determine that a user's gaze has moved from a first display 120 in a direction of a second display 120 will be discussed below.

In some embodiments, movement of a user's gaze between display devices 120 which are on at least the approximately same horizontal level (for example, display devices 120A, 120B, and 120C) may be detected based upon an associated eye tracking device 130 only being able to detect one eye of the user over at least a predetermined threshold of time. This may indicate that a user has turned their head and/or gaze such that only the trailing eye of the user is still in the useful range of a particular eye tracking device 130, and that the leading eye is not in the useful range of particular eye tracking device 130. This likely means that the leading eye (as well as the trailing eye) is in range of the eye tracking device 130 associated with a display device 120 to which the user's gaze is now being directed. The direction in which the gaze direction has traveled just prior to an eye tracking device 130 device only detecting one eye of the user (i.e., that the gaze direction moved to the left or right of the associated display device 120) may also inform processor 110 that the gaze direction of the user has shifted to another display device 120.

In some embodiments, processor 110 may be configured to determine the relative positions, sizes, and/or directions of available display devices 120, and then correlate therewith information received from an active eye tracking device 130 to determine when a user's gaze is travelling in the direction of nearby display devices 120 not associated with the currently active eye tracking device 130. Referring again to FIG. 2, eye tracking device 130A may be able to more directly determine, based on the position, size, and/or direction information of available display devices 120, that the user's gaze has moved from display device 120A to display device 120B, since the user's gaze direction may at least pass through a portion of display device 120B, whose size and/or position is known, because the effective range of eye tracking device 130A. In some embodiments, the distance between the user's gaze point and predetermined coordinates (based on the location of the displays 120 and eye tracking devices 130), or movement of the absolute position of the user's head or eyes may be determinative of whether the gaze point of the user has shifted enough to warrant switching active eye tracking devices 130.

As with the previously described method of identifying when only a trailing eye is detectable by an eye tracking device 130, the direction of movement of a user's gaze direction prior to the detected change in which display the user is currently gazing at may also inform processor 110 of the likely course/destination of the user's gaze direction. Additionally, in some instances, processor 110 may be able to detect, at least momentarily, when only a single eye of each user is detected by each of two eye tracking devices 130, and therefore know when the user's gaze is transitioning from one display device 120 to another. In some embodiments, eye tracking devices 130 may communicate more directly with each other, and thereby implement the methods described herein, with or without the assistance of processor 110. Such communication could occur via a wired or wireless communication medium, as known in the art.

Information regarding the position, size, and/or direction of available display devices 120 may be determined in a number of manners. In some embodiments, the operating system or a graphics processing unit configurator (for example, NVIDIA™ Control Panel or AMD™ Catalyst Control Center) of processor 110, where it has previously been informed of such information by the user or by another more automated process, may be able to provide such information on request by a software package, subroutine, etc. which is implementing the systems/methods described herein. Location data specifying the position, size, and/or direction may include a location data set providing dimensional data on the placement and size of each display device 120.

In some embodiments, the position, size, and/or direction of available display devices 120 may be determined more directly via a setup process conducted with display devices 120 and eye tracking devices 130. In these embodiments, processor 110 may cause each of display devices 120 to present display content having different points of interest near their extremes (i.e., sides and corners). Processor 110 may direct the user through on-screen instructions to direct their gaze to each of the points of interest, and user one or more eye tracking devices to determine the user's gaze direction. This information may be saved, thereby creating location data comparable to that obtainable through other methods described herein.

In any of the described embodiments, processor 110 may also be informed that a user is transitioning their gaze to a different display device 120 based on a determination that the user's gaze was located within a certain proximity to an edge of an effective area of the first display within a certain time prior to detecting one eye of the user, but not another eye of the user, with a particular eye tracking device 130, or within a certain time of otherwise receiving additional indications that the user's gaze has shifted to a different display device 120.

In some embodiments, processor 110 may also be configured to interleave the frequency of operation of multiple eye tracking devices 130 during transition of the user's gaze direction between display devices 120 associated with the eyes tracking devices 130. Merely by way of example, if processor 110 receives any indication that the user's gaze direction may be moving toward a different display device 120 than the current active display device 120, the frequency of operation of the first eye tracking device 130 may be changed from a first frequency (for example, 60 Hz) to a second frequency (for example, 30 Hz), and the second eye tracking device 130 may be activated and set to operate an interleaved manner with the first eye tracking device 130. For example, the second eye tracking device 130 may be activated at 30 Hz, and interleave operation with the first eye tracking device 130 also operating at 30 Hz.

Thus, a number of conditions may be determinative, alone or in combination, of whether a user's gaze direction has shifted to another display device 120 from the display device associated with the currently active eye tracking device 130. In embodiments where an eye tracking device 130 is deactivated upon activation of another eye tracking device 130, deactivation may occur at a number of possible times. Merely by way of example, deactivation of a first eye tracking device 130, and activation of a second eye tracking device 130, may occur upon at least the second eye tracking device 130 detecting both eyes of the user. In some embodiments, deactivation of the first eye tracking device 130, and activation of the second eye tracking device 130, may occur upon at least the second eye tracking device 130 successfully determining the gaze direction of the user relative to the second display 120 (i.e., by both eyes of the user being detected within a track box associated with second display 120 and/or an eye tracking device 130 associated with second display 120.

In other embodiments, deactivating the first eye tracking device 130 may occur upon the user's gaze direction leaving an effective area of the first display device 120. But in other embodiments, the processor may be further configured to determine a distance between an effective area of the first display 120 and an effective area of the second display 120, and deactivate the first eye tracking device 130 upon the user's gaze direction crossing a predetermined boundary within the distance between the effective area of the first display 120 and the effective area of the second display 120. In this manner, the performance of each eye tracking device 130, when active, may be maximized.

In some embodiments, deactivating the first eye tracking device 130 may occur upon the user's gaze direction entering an effective area of the second display 120. In these embodiments, activating the second eye tracking device 130 may also occur upon the user's gaze direction entering the effective area of the second display 120.

In other embodiments, deactivating the first eye tracking device 130 may occur upon the user's gaze direction leaving an effective area of the first display 120. In these embodiments, activating the second eye tracking device 130 may also occur upon the user's gaze direction exiting the effective area of the first display 120.

In other embodiments, deactivating the first eye tracking device 130 may occur upon the user's gaze direction reaching a certain distance from an effective area of the first display 120. In these embodiments, activation of the second eye tracking device 130 may occur upon the user's gaze direction reaching a particular distance from an effective area of the second display 120. The certain distance and the particular distance may or may not represent a common location or boundary.

In some embodiments, systems of the invention may include fewer displays 120 than eye tracking devices 130 (or vice versa). In embodiments having fewer displays 120 than eye tracking devices 130, eye tracking devices 130 not associated with a display 120 may be employed to determine a user's gaze direction away from a track box associated with display 120/eye tracking device 130 pairs. This may allow such systems to determine a user's gaze point with respect to items not on the displays 120. In embodiments having fewer eye tracking devices 130 than displays 120, eye tracking devices 130 may be arranged such that their track boxes provide coverage of the user's gaze point over the entirety or some portion of the effective area of all displays 120 present.

Figure 3:
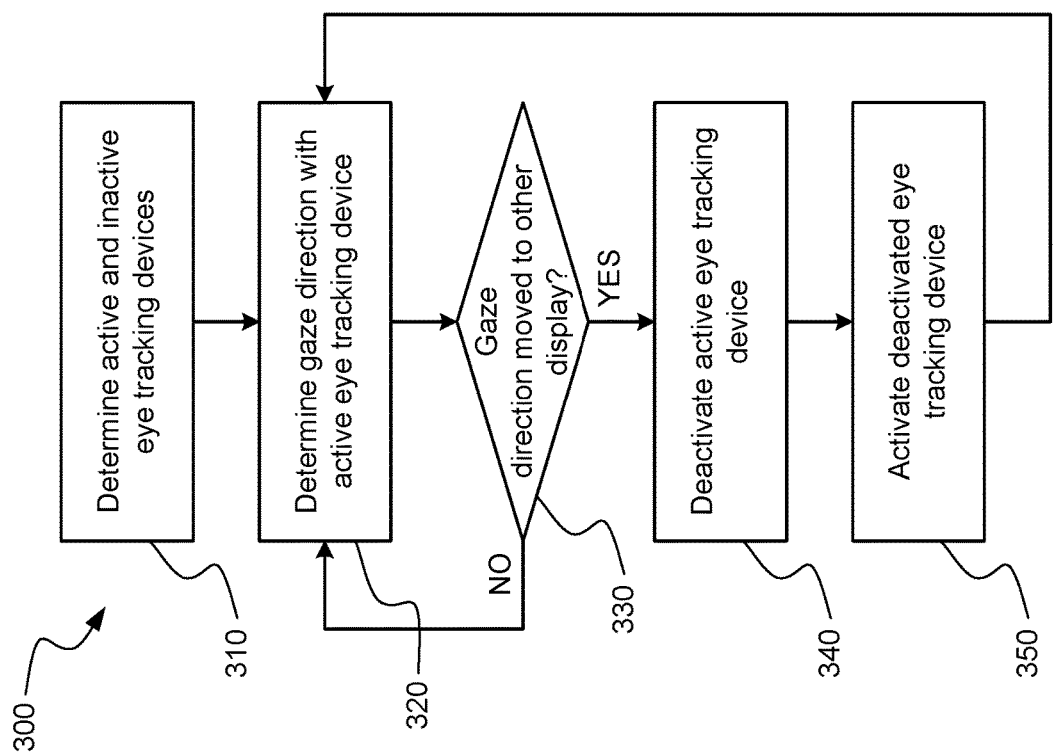
FIG. 3 is a flow diagram of one method of the invention for tracking a gaze of a user across a multi-display arrangement.

Turning now to FIG. 3, a block diagram for a method 300 of the invention for tracking a gaze of a user across a multi-display arrangement is shown. At block 310, processor 110 may determine for an initial system 100 state, as described above, which eye tracking devices 130 should be active, and which eye tracking devices 130 should be inactive.

At block 320, while a first eye tracking device 130 associated with a first display 120 is the active, processor 110 may determine the user's gaze direction. At block 330, processor 110 may determine, via first eye tracking device 130, and/or via other available information such as location data regarding the displays 120, whether the user's gaze direction has moved toward a second display 120. If not, method 300 continues to monitor the user's gaze direction about the first display 120 at block 320.

However, if at block 330 processor 110 has determined that the user's gaze direction has moved toward a second display 120, at block 340, processor 110 may deactivate first eye tracking device 130. At block 350 processor 110 may activate a second eye tracking device 130 associated with as second display 120, about which the user's gaze direction is now located. Method 300 then returns to block 320 and monitors the user's gaze direction about second display 120, while awaiting a change in which display 120 the user directs their gaze to at block 330.

Figure 4:
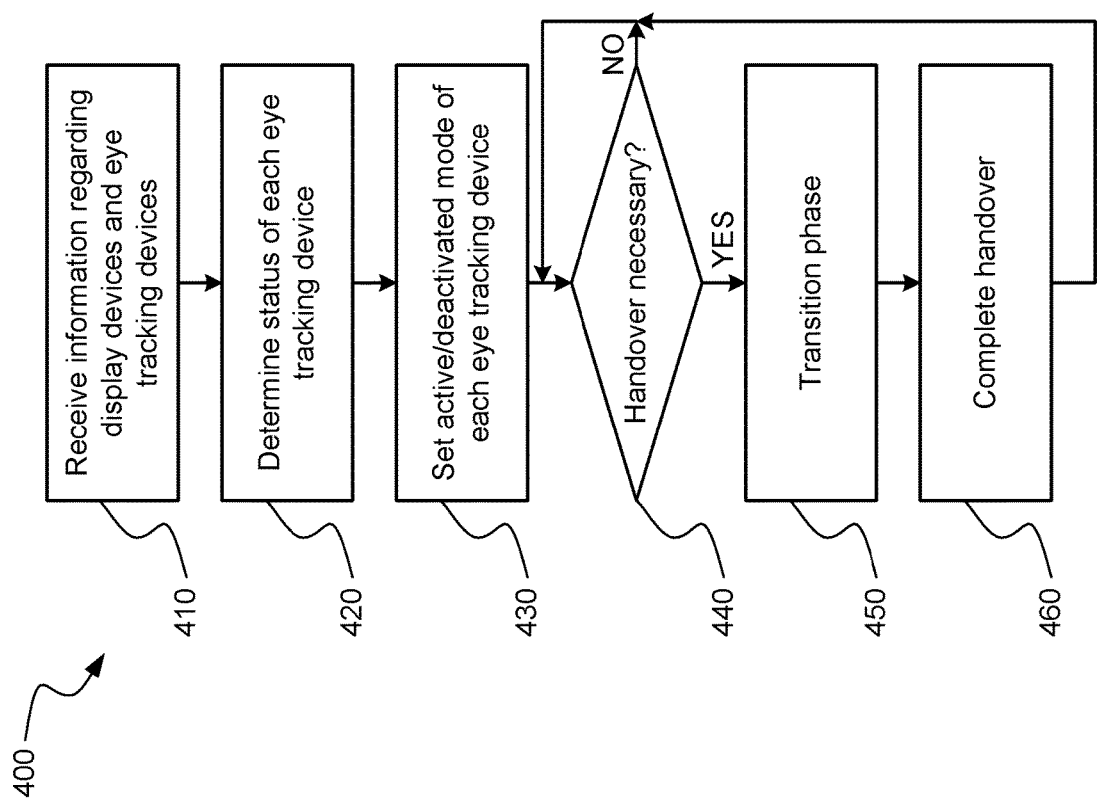
FIG. 4 is a flow diagram of another method of the invention for tracking a gaze of a user across a multi-display arrangement.

A more detailed method 400 of the invention is shown in FIG. 4. At block 410, information regarding the position, size, orientation and/or direction of available display devices 120 may be received, as described above. Additionally, information regarding the position and/or direction of available eye tracking devices 130 may also be received.

At block 420, the status of each eye tracking device 130 is determined, including determining, as discussed above, which eye tracking device 130 should be in active mode (i.e., the eye tracking device 130 which can best determine the user's gaze direction compared to other avail eye tracking devices 130), and which should be in deactivated mode. At block 430, the appropriate eye tracking device 130 is activated in response to the status determination, and all other eye trackers are placed in deactivated mode.

At block 440, it is determined whether a handover from the active eye tracking device 130 to a deactivated eye tracking device 130 is necessary. This may occur for any of the reasons discussed above, including for example, if the gaze position is or has been near the edge of a display 120, if both eyes of the user cannot be detected by the active eye tracking device 130, and/or based on history of movement of the user's gaze position.

Figure 5:
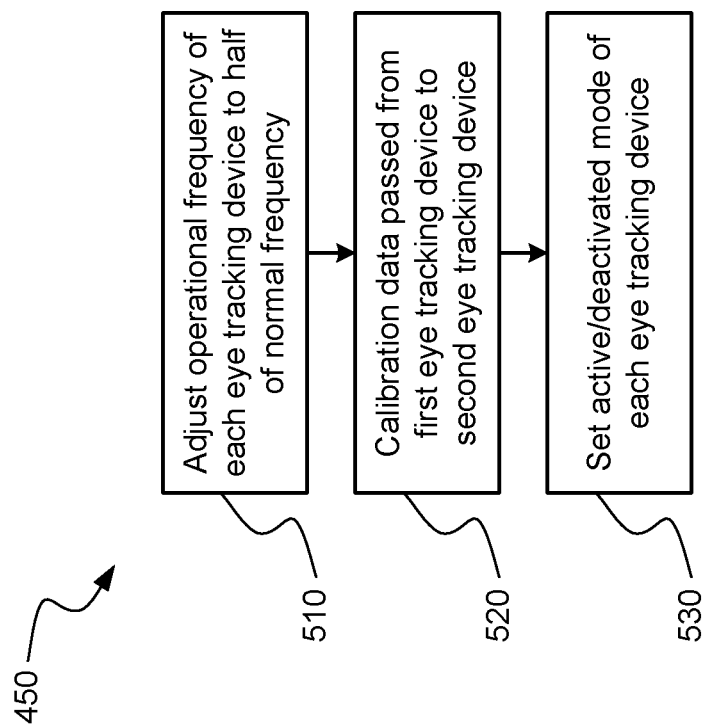
FIG. 5 is a flow diagram of a method of the invention for conducting a hand-off process between two eye tracking devices.

At block 450, the transition phase between a presently active first eye tracking device 130 and a second eye tracking device 130 to be activated may occur, as will be discussed in greater detail with respect to FIG. 5 below. At block 460, to complete the process, the first eye tracking device 130 is deactivated, and the second eye tracking device 130 is activated. Blocks 450 and 460 may then repeat upon a new determination that another handover is necessary to a different eye tracking device 130 from the second eye tracking device 130.

The transition phase of block 450 is described in greater detail with reference to FIG. 5. At block 510, the operational frequency of the first eye tracking device 130, which is presently active, is reduced to half of its normal operational frequency. The operational frequency of the second eye tracking device 130, which is presently deactivated, is raised to half of its normal operational frequency. The operational frequencies of the two eye tracking devices 130 may be interleaved so that at any given moment in time, only one of the two eye tracking devices 130 is operable. At block 520, the calibration data is passed between the two eye tracking devices to ensure consistent and accurate operation for the user upon completion of the transition. At block 530, the second eye tracking device 130 finalizes the recovery process of obtaining a reliable gaze direction once both eyes of the user are detected. The process then returns to method 400 at block 460.

Figure 6:
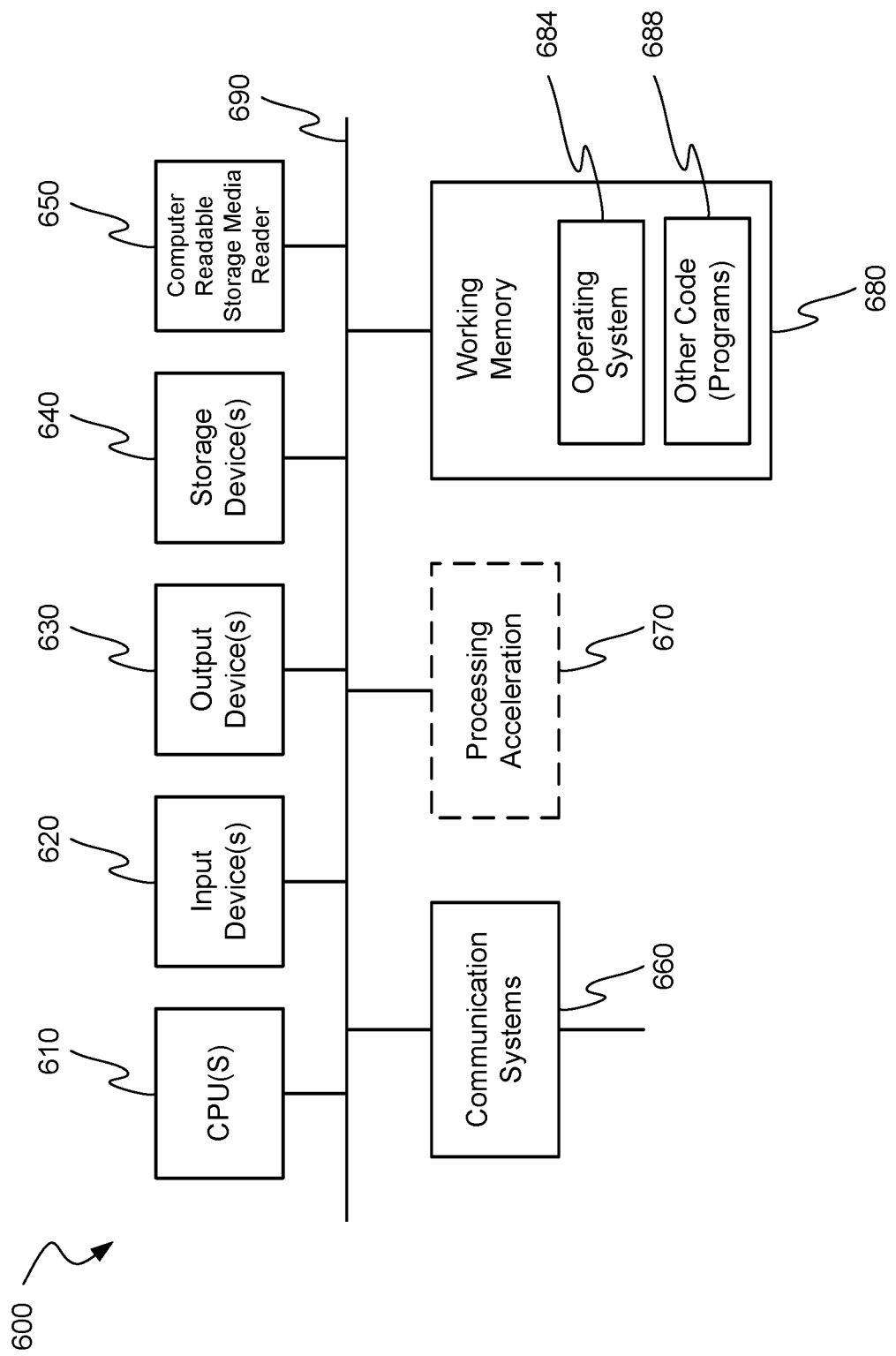
FIG. 6 is a block diagram of an exemplary computer system capable of being used in at least some portion of the apparatuses or systems of the present invention, or implementing at least some portion of the methods of the present invention.

FIG. 6 is a block diagram illustrating a specialized computer system 600 in which embodiments of the present invention may be implemented. This example illustrates specialized computer system 600 such as may be used, in whole, in part, or with various modifications, to provide the functions of processor 110, displays 120, eye tracking devices 130, and/or other components of the invention such as those discussed above. For example, various functions of eye tracking devices 130 may be controlled by specialized computer system 600, including, merely by way of example, activating or deactivating, determining gaze direction, etc.

Specialized computer system 600 is shown comprising hardware elements that may be electrically coupled via a bus 690. The hardware elements may include one or more central processing units 610, one or more input devices 620 (e.g., a mouse, a keyboard, etc.), and one or more output devices 630 (e.g., a display device, a printer, etc.). Specialized computer system 600 may also include one or more storage device 640. By way of example, storage device(s) 640 may be disk drives, optical storage devices, solid-state storage device such as a random access memory ("RAM") and/or a read-only memory ("ROM"), which can be programmable, flash-updateable and/or the like.

Specialized computer system 600 may additionally include a computer-readable storage media reader 650, a communications system 660 (e.g., a modem, a network card (wireless or wired), an infra-red communication device, Bluetooth™ device, cellular communication device, etc.), and working memory 680, which may include RAM and ROM devices as described above. In some embodiments, specialized computer system 600 may also include a processing acceleration unit 670, which can include a digital signal processor, a special-purpose processor and/or the like.

Computer-readable storage media reader 650 can further be connected to a computer-readable storage medium, together (and, optionally, in combination with storage device(s) 640) comprehensively representing remote, local, fixed, and/or removable storage devices plus storage media for temporarily and/or more permanently containing computer-readable information. Communications system 660 may permit data to be exchanged with a network, system, computer and/or other component described above.

Specialized computer system 600 may also comprise software elements, shown as being currently located within a working memory 680, including an operating system 684 and/or other code 688. It should be appreciated that alternate embodiments of specialized computer system 600 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of specialized computer system 600 may include code 688 for implementing any or all of the function of the various elements of the architecture as described herein. For example, software, stored on and/or executed by a specialized computer system such as specialized computer system 600, can provide the functions of processor 110, displays 120, eye tracking devices 130, and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of the appended claims.

What is claimed is:

1. A system for tracking a gaze of a user across a multi-display arrangement, the system comprising:
 a first display;
 a first eye tracking device configured to determine a user's gaze direction while the user is gazing at the first display;
 a second display;
 a second eye tracking device configured to determine the user's gaze direction while the user is gazing at the second display; and
 a processor configured to:
  determine that the user's gaze has moved away from the first display in a direction of the second display;
  wherein determining that the user's gaze has moved away from the first display in the direction of the second display comprises detecting one eye of the user, but not another eye of the user, with the first eye tracking device;
  wherein determining that the user's gaze has moved away from the first display in the direction of the second display further comprises detecting only one eye of the user, but not another eye of the user, with the second eye tracking device;
  in response to determining that the user's gaze has moved away from the first display in the direction of the second display:
   deactivate the first eye tracking device; and
   activate the second eye tracking device;
  determine to execute a handover from the second eye tracking device to the first eye tracking device:
   when the user's gaze direction is or has been near an edge of the first display or an edge of the second display;
   when both eyes of the user cannot be detected by the second eye tracking device; or
   based on a history of movement of the user's gaze position; and
  execute the handover by activating the first eye tracking device and deactivating the second eye tracking device.

2. The system for tracking a gaze of a user across a multi-display arrangement of claim 1, wherein:
 the first eye tracking device is further configured to determine the user's gaze direction while the user is gazing away from the first display.

3. The system for tracking a gaze of a user across a multi-display arrangement of claim 1, wherein:
 the second eye tracking device is further configured to determine the user's gaze direction while the user is gazing away from the second display.

4. The system for tracking a gaze of a user across a multi-display arrangement of claim 1, wherein:
 the processor is further configured to determine a direction of the second display relative to the first display.

5. The system for tracking a gaze of a user across a multi-display arrangement of claim 1, wherein:
 determining the direction of the second display relative to the first display comprises receiving location data which includes a position of the second display relative to the first display.

6. The system for tracking a gaze of a user across a multi-display arrangement of claim 5, wherein:
 the location data also includes a size of the first display relative to a size of the second display.

7. The system for tracking a gaze of a user across a multi-display arrangement of claim 6, wherein:
 determining the direction of the second display relative to the first display comprises receiving location data from an operating system or a graphics processing unit configurator running on the processor.

8. The system for tracking a gaze of a user across a multi-display arrangement of claim 7, wherein:
 the processor is further configured to request the direction of the second display relative to the first display from the operating system or the graphics processing unit configurator running on the processor.

9. The system for tracking a gaze of a user across a multi-display arrangement of claim 6, wherein:
 determining the direction of the second display relative to the first display comprises detecting one eye of the user, but not another eye of the user, with the first eye tracking device, and detecting only one eye of the user, but not another eye of the user, with the second eye tracking device.

10. The system for tracking a gaze of a user across a multi-display arrangement of claim 1, wherein:
 determining that the user's gaze has moved away from the first display in the direction of the second display further comprises determining that the user's gaze was located within a certain proximity to an edge of an effective area of the first display within a certain time prior to detecting one eye of the user, but not another eye of the user, with the first eye tracking device.

11. The system for tracking a gaze of a user across a multi-display arrangement of claim 1, wherein:
the processor is further configured to, upon at least detecting one eye of the user, but not another eye of the user, with the first eye tracking device, and detecting one eye of the user, but not another eye of the user, with the second eye tracking device, reduce a frequency of operation of the first eye tracking device from a first frequency to a second frequency, wherein the second frequency is half of the first frequency, and wherein activating the second eye tracking device comprises operating the second eye such that a frequency of operation of the second eye tracking device is the second frequency.

12. The system for tracking a gaze of a user across a multi-display arrangement of claim 11, wherein:
the processor is further configured to, upon at least detecting one eye of the user, but not another eye of the user, with the first eye tracking device, and detecting one eye of the user, but not another eye of the user, with the second eye tracking device, interleave the frequency of operation of the first eye tracking device with the frequency of operation of the second eye tracking device.

13. The system for tracking a gaze of a user across a multi-display arrangement of claim 12, wherein:
deactivation of the first eye tracking device and activation of the second eye tracking device occurs upon at least the second eye tracking device detecting both eyes of the user.

14. The system for tracking a gaze of a user across a multi-display arrangement of claim 13, wherein:
deactivation of the first eye tracking device and activation of the second eye tracking device occurs upon at least the second eye tracking device successfully determining the gaze direction of the user relative to the second display.

15. The system for tracking a gaze of a user across a multi-display arrangement of claim 1, wherein:
deactivating the first eye tracking device occurs upon the user's gaze direction leaving an effective area of the first display.

16. The system for tracking a gaze of a user across a multi-display arrangement of claim 1, wherein:
the processor is further configured to determine a distance between an effective area of the first display and an effective area of the second display; and
deactivating the first eye tracking device occurs upon the user's gaze direction crossing a predetermined boundary within the distance between the effective area of the first display and the effective area of the second display.

17. The system for tracking a gaze of a user across a multi-display arrangement of claim 1, wherein:
deactivating the first eye tracking device occurs upon the user's gaze direction entering an effective area of the second display.

18. The system for tracking a gaze of a user across a multi-display arrangement of claim 1, wherein:
deactivating the first eye tracking device occurs upon the user's gaze direction reaching a certain distance from an effective area of the first display.

19. The system for tracking a gaze of a user across a multi-display arrangement of claim 1, wherein:
activating the second eye tracking device occurs upon the user's gaze direction leaving an effective area of the first display.

20. The system for tracking a gaze of a user across a multi-display arrangement of claim 1, wherein:
the processor is further configured to determine a distance between the first display and the second display; and
activating the second eye tracking device occurs upon the user's gaze direction crossing a predetermined boundary within the distance between the first display and the second display.

21. The system for tracking a gaze of a user across a multi-display arrangement of claim 1, wherein:
activating the second eye tracking device occurs upon the user's gaze direction entering an effective area of the second display.

22. The system for tracking a gaze of a user across a multi-display arrangement of claim 1, wherein:
activating the second eye tracking device occurs upon the user's gaze direction reaching a certain distance from an effective area of the first display.

23. The system for tracking a gaze of a user across a multi-display arrangement of claim 1, wherein the system further comprises:
a third display;
a third eye tracking device configured to determine the user's gaze direction while the user is gazing at the third display; and
the processor is further configured to:
determine a direction of the third display relative to the first display or the second display;
determine that the user's gaze has moved away from the first display or the second display in the direction of the third display; and
in response to determining that the user's gaze has moved away from the first display or the second display in the direction of the third display:
deactivate the first eye tracking device or the second eye tracking device; and
activate the third eye tracking device.

24. A method for tracking a gaze of a user across a multi-display arrangement, the method comprising:
determining a user's gaze direction with a first eye tracking device while the user is gazing at a first display;
determining the user's gaze direction with a second eye tracking device while the user is gazing at a second display;
determining that the user's gaze has moved away from the first display in a direction of the second display;
wherein determining that the user's gaze has moved away from the first display in the direction of the second display comprises detecting one eye of the user, but not another eye of the user, with the first eye tracking device;
wherein determining that the user's gaze has moved away from the first display in the direction of the second display further comprises detecting only one eye of the user, but not another eye of the user, with the second eye tracking device;
in response to determining that the user's gaze has moved away from the first display in the direction of the second display:
deactivating the first eye tracking device; and
activating the second eye tracking device;
determining to execute a handover from the second eye tracking device to the first eye tracking device:

when the user's gaze direction is or has been near an edge of the first display or an edge of the second display;

when both eyes of the user cannot be detected by the second eye tracking device; or based on a history of movement of the user's gaze position; and executing the handover by activating the first eye tracking device and deactivating the second eye tracking device.

25. A non-transitory machine readable medium having instructions stored thereon for tracking a gaze of a user across a multi-display arrangement, wherein the instructions are executable by one or more processors for at least:

determining a user's gaze direction with a first eye tracking device while the user is gazing at a first display;

determining the user's gaze direction with a second eye tracking device while the user is gazing at a second display;

determining that the user's gaze has moved away from the first display in a direction of the second display;

wherein determining that the user's gaze has moved away from the first display in the direction of the second display comprises detecting one eye of the user, but not another eye of the user, with the first eye tracking device;

wherein determining that the user's gaze has moved away from the first display in the direction of the second display further comprises detecting only one eye of the user, but not another eye of the user, with the second eye tracking device;

in response to determining that the user's gaze has moved away from the first display in the direction of the second display:

deactivating the first eye tracking device; and activating the second eye tracking device;

determining to execute a handover from the second eye tracking device to the first eye tracking device:

when the user's gaze direction is or has been near an edge of the first display or an edge of the second display;

when both eyes of the user cannot be detected by the second eye tracking device; or based on a history of movement of the user's gaze position; and executing the handover by activating the first eye tracking device and deactivating the second eye tracking device.

\* \* \* \* \*